United States Patent [19]
Malecha

[11] Patent Number: 5,234,390
[45] Date of Patent: Aug. 10, 1993

[54] GEAR TRANSMISSION WITH UNDULATING SURFACE CLUTCH AND BRAKE ELEMENT CONNECTIONS

[75] Inventor: Gregory J. Malecha, Naperville, Ill.

[73] Assignee: Borg-Warner Automotive Transmission and Engine Components Corporation, Sterling Heights, Mich.

[21] Appl. No.: 819,145

[22] Filed: Jan. 9, 1992

[51] Int. Cl.$^5$ .................................... F16D 15/00
[52] U.S. Cl. .................. 475/281; 192/45.1; 464/75
[58] Field of Search ............ 192/45.1, 41 A; 475/281, 289, 292; 464/75

[56] References Cited

U.S. PATENT DOCUMENTS

| | | | |
|---|---|---|---|
| 288,134 | 11/1883 | Stone | 464/75 X |
| 1,359,468 | 11/1920 | Schmidt | 192/45.1 |
| 1,912,703 | 6/1933 | Gamble | 464/75 X |
| 2,268,376 | 12/1941 | Dodge | 192/45.1 |
| 2,639,496 | 5/1953 | Hartzell | 464/75 X |
| 3,257,860 | 6/1964 | Runde et al. | 464/75 X |
| 3,532,198 | 10/1970 | Lederman | 192/45.1 |
| 3,800,927 | 4/1974 | Takata | 192/45 |
| 3,941,013 | 3/1976 | Miller | 475/281 X |
| 4,493,407 | 1/1985 | Newton | 464/75 X |
| 4,770,054 | 9/1988 | Ha | 192/45.1 X |
| 4,788,874 | 12/1988 | Nelson et al. | 192/41 A X |
| 4,821,856 | 4/1989 | Lederman | 192/45 |
| 4,993,528 | 2/1991 | Lederman | 192/45 |

FOREIGN PATENT DOCUMENTS

| | | | |
|---|---|---|---|
| 1144975 | 3/1963 | Fed. Rep. of Germany | 192/45 |
| 2023639 | 12/1971 | Fed. Rep. of Germany | 475/281 |
| 2065400 | 8/1973 | Fed. Rep. of Germany | 475/281 |
| 47-21370 | 6/1972 | Japan | 475/281 |
| 61-192953 | 8/1986 | Japan | 475/281 |

OTHER PUBLICATIONS

A Better Way To Make Shaft Connections, by David Ryffel, Machine Design magazine, Aug. 11, 1988, at p. 124.
Locating Nodes On Radially Loaded Rings by David Hustvedt, Machine Design magazine, Apr. 20, 1986.

*Primary Examiner*—Rodney H. Bonck
*Assistant Examiner*—Ryan W. Massey
*Attorney, Agent, or Firm*—Brooks & Kushman

[57] ABSTRACT

An improved gear transmission (10) includes a one-way clutch (52) for connecting together selectively two drive elements to establish a plural torque flow path through the transmission (10) and the clutch (52) includes at least one inner race (52B) and one outer race (52A), each of the races having coaxial inner and outer race portions, the outer surface (112) of the outer race portion (52B) defined by a first undulating surface, the inner surface (113) of a mating drive element defined by a second undulating surface in conjugate registration with the first undulating surface, the profiles of the first and second undulating surfaces (112,113) being controlled to provide a controlled clearance therebetween reducing shock loading at the interface of the inner and outer race portions through a gradual lock-up through a controlled wind-up of the mating members and reducing vibration in the gear elements.

14 Claims, 3 Drawing Sheets

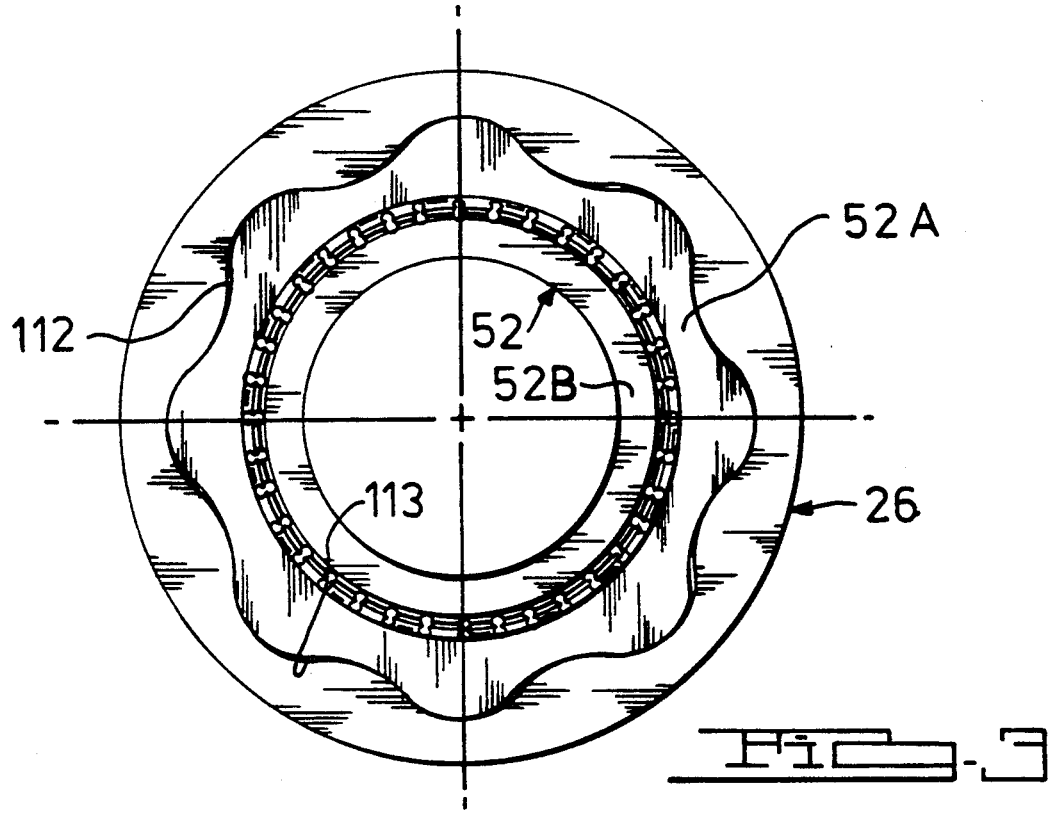
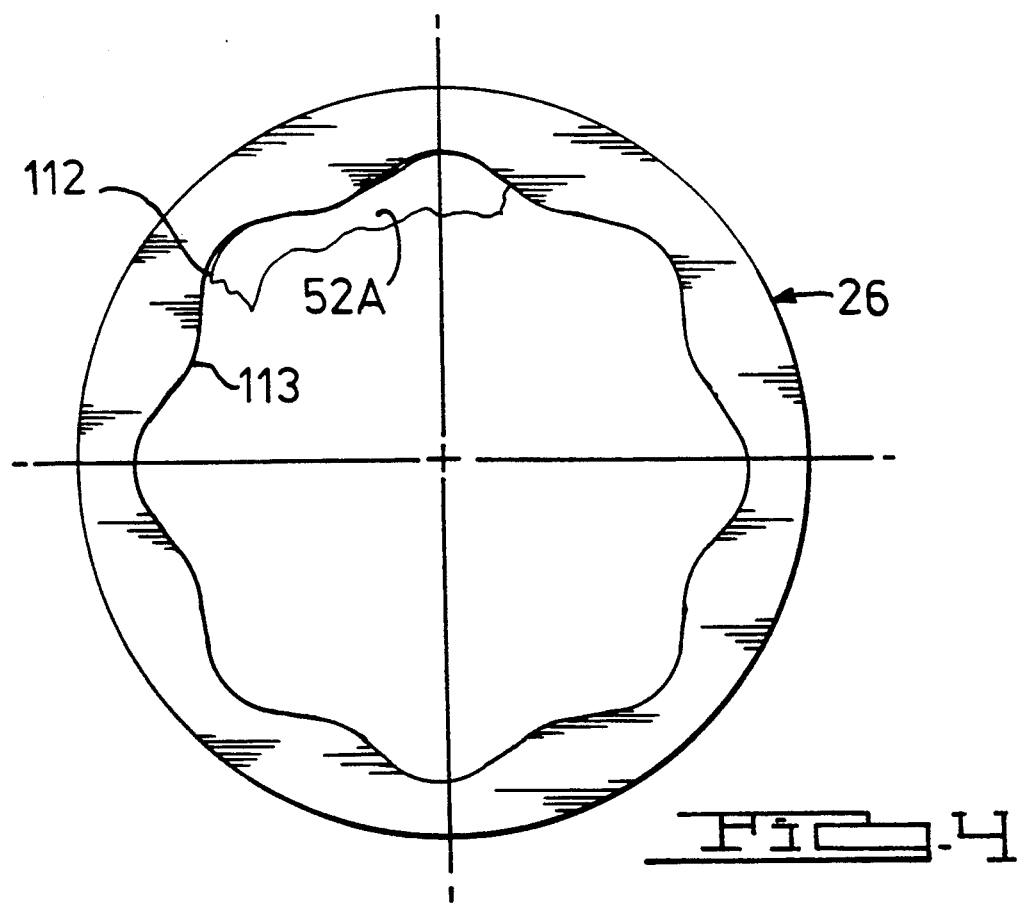

GEAR TRANSMISSION WITH UNDULATING SURFACE CLUTCH AND BRAKE ELEMENT CONNECTIONS

TECHNICAL FIELD

This invention relates to overrunning couplings for use in gear transmissions and more specifically to an improved one-way connection between a clutch or brake element and another transmission element to reduce shock loading and vibration.

BACKGROUND ART

A conventional connection between a one-way clutch or brake element and another transmission element in a gear transmission includes conventional splines in which a plurality of parallel spline teeth is formed integrally with a race of the clutch or brake element and a plurality of spline tooth spaces is formed in a mating transmission element. Such spline connections are capable of transmitting heavy torques but they have inherent drawbacks, such as the relatively high manufacturing cost and the need for aligning the mating spline teeth for assembly. Furthermore, the backlash between the mating spline teeth that prevents the teeth from jamming together causes shock loading upon clutch or brake engagement and speed change, such as during shifting. This may cause damaging shock loading and/or vibration upstream and/or downstream in the torque flow path.

One publication entitled "A Better Way To Make Shaft Connections" by David Ryffel, found in MACHINE DESIGN magazine dated Aug. 11, 1988 at page 124, discusses the use of a polygonal profile in a torque transmitting connection for locking a shaft to a hub. The connection comprises polygonal lobes on a shaft which register with polygonal internal spaces on a hub.

Another publication entitled "Locating Nodes On Radially Loaded Rings" by David Hustvedt and found in MACHINE DESIGN magazine dated Apr. 10, 1986 discusses use of a differential bending equation to calculate node point locations on a circular ring subjected to equal, uniformly spaced radial loads.

DISCLOSURE OF INVENTION

An object of the present invention is to provide an automatic transmission having an improved connection between a clutch or brake element and a mating transmission element that reduces shock loading and/or vibration on transmission components upstream or downstream of the clutch and brake element.

Another object of the present invention is to provide an automatic transmission having an improved connection between a clutch or brake element and a mating transmission element that provides a gradual lock-up through a controlled wind-up of the mating members by using a wedging lock-up.

It is a further object of the present invention to provide an automatic transmission having an improved connection between the clutch or brake and a mating element that is less costly than conventional spline connections.

Yet another object of the present invention is to provide an automatic transmission having an improved connection between a clutch or brake element and mating elements that is easier to assemble because the need to align spline teeth has been eliminated.

A preferred embodiment of the invention comprises a gear transmission adapted to transmit torque in one direction between a driving member and a driven member including a ring gear element, a sun gear element and a plurality of planet pinions meshing with the ring gear element and sun gear element. A carrier element is adapted to journal the pinions.

The driving member is drivably connected to one of the elements and the driven member is connected to a second of the elements. A clutch element selectively connects two of the elements and a brake element anchors selectively one of the elements to establish a plural torque flow path through the transmission. The clutch and brake elements comprise at least one inner race and one outer race. Each of the races has coaxial inner and outer race portions. The outer surface of the outer race portion has a first undulating surface and the inner surface of the connected element has a second undulating surface in conjugate registration with the first undulating surface. The profiles of the first and second undulating surfaces are designed to provide a controlled clearance between the races that provide a gradual lock-up through a controlled wind-up. This reduces shock loading and torsional vibration in gear elements upstream and downstream of the clutch and brake element.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a front view of a one-way clutch or brake element illustrating coaxial inner and outer race portions with undulating surfaces in conjugate registration; and FIG. 4 is a sectional view of the one-way clutch and brake element of FIG. 3 illustrating the controlled clearance between the registering inner and outer races.

BEST MODE FOR CARRYING OUT THE INVENTION

Figure 1:
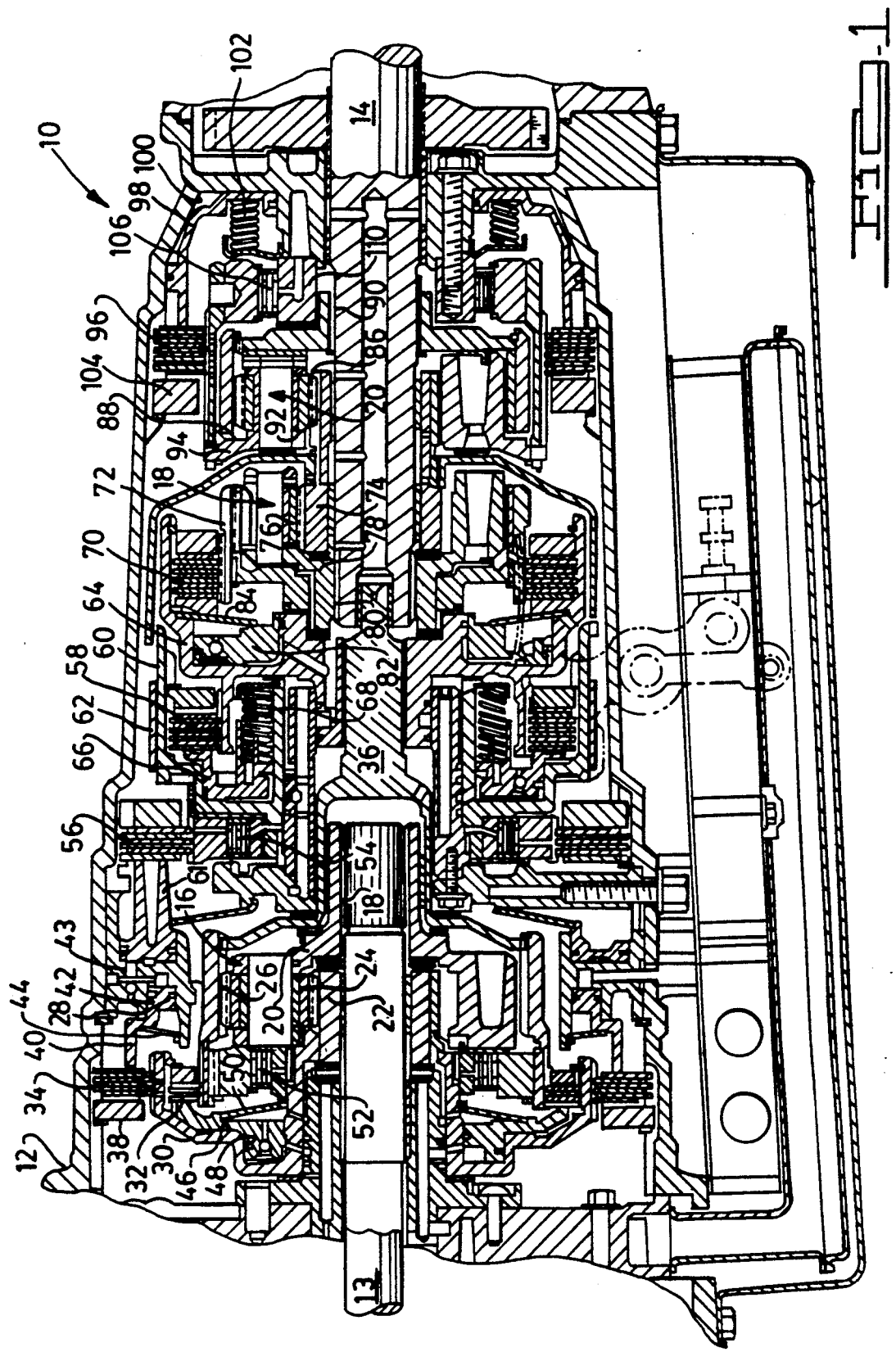
FIG. 1 is a cross-section of a transmission according to the invention showing in the assembled condition, the clutches, brakes and gear units.
Figure 2:
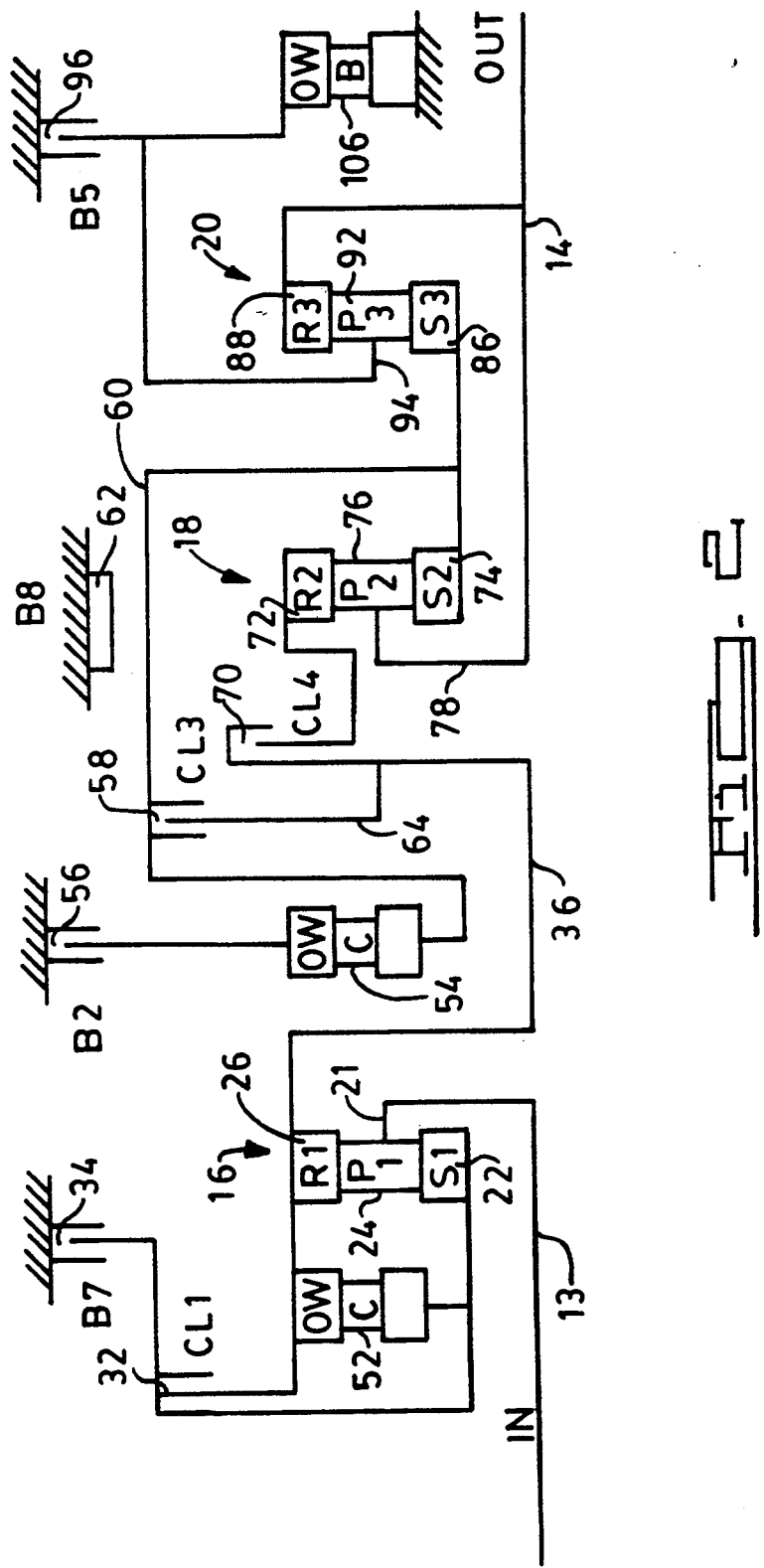
FIG. 2 is a diagram of the multiple speed transmission showing the components that operate to produce each of the various speeds.

FIGS. 1 and 2 of the drawings show a gear transmission of the type having series related friction brakes and overrunning clutches adapted to transmit torque in one direction between a driving member and a driven member. It is indicated generally by reference numeral 10. A main transmission housing 12 encloses simple planetary gear units 16, 18 and 20. An input shaft 13 is connected to carrier 21 of first planetary gearset 16, which includes sun gear 22, a set of planetary pinions 24 rotatably supported on carrier 21 and ring gear 26. Sun gear 22 is drivably connected to a member 30 that is common to a coast clutch 32 and an overdrive brake 34. Ring gear 26 is drivably fixed to a drum portion 28 connected to intermediate shaft 36.

Overdrive brake 34 includes a set of clutch discs fixed to housing 12, a load block 38 fixed to housing 12, a set of clutch discs drivably connected to the outer surface of clutch member 30 and interposed between the discs affixed to the housing, a clutch piston 40 displaceable hydraulically against the clutch disc assembly and hydraulic cylinder 42 containing piston 40. A Belleville spring 44 returns piston 40 to the inactive position when hydraulic pressure is removed from cylinder 42.

Coast clutch 32 includes a set of clutch discs drivably connected to the inner surface of clutch member 30, a load block connected to the inner surface of clutch member 30, a second set of clutch discs drivably fixed to ring gear 26, piston 46 actuated hydraulically to engage the coast clutch disc sets, a hydraulic cylinder 48 within which piston 46 moves, and a Belleville spring 50 to return piston 46 to the disengaged position when hydraulic pressure is removed from cylinder 48.

A first one-way clutch 52 has its outer race 52A formed with an undulating profiled outer surface 112, as illustrated in FIGS. 3 and 4. It is drivably connected and in conjugate registration with a corresponding profiled inner surface 113 of ring gear 26. Clutch 52 has an inner race 52B drivably connected by a spline to cylinder 48 and to sun gear 22, and a driving member located in the annulus between the inner and outer races for producing a one-way clutch 54 is located between intermediate brake 56 and direct clutch 58.

One-way clutch 54 includes an outer race that carries a set of brake discs for the intermediate brake 56, an inner race drivably fixed to drum 60, and a driving member located in the annular region between the inner and outer races for producing a one-way drive connection therebetween. The outer race of one-way clutch 54 has an undulating profile and the inner surface of intermediate brake 56 has a corresponding undulating profile as illustrated in FIGS. 3 and 4, for conjugate registration as hereinafter more fully described.

Intermediate brake 56 includes a second set of brake discs fixed to housing 12, a load block fixed to the housing, a piston 61 actuated hydraulically to force the brake disc sets into drivable relationship against the load block, hydraulic cylinder 43 within which piston 61 moves and a Belleville spring.

Drum 60 is stopped and held against the transmission casing through the action of an intermediate brake band 62 actuated via a conventional manner by a hydraulic transmission servo, not shown. Direct clutch 58 operates to produce a drive connection between drum 60 and clutch member 64. The direct clutch includes a first set of clutch discs splined to the inner surface of drum 60 and a second set of clutch discs connected to clutch member 64 which are interposed between successive members of the first clutch disc set. A piston 66 moves within a hydraulic cylinder to force the clutch disc sets into drivable connection against the load block that is carried on the inner surface of the drum 60. Piston 66 moves within the hydraulic cylinder defined by drum 60 and is restored to its disengaged position through operation of coil compression springs 68.

Forward clutch 70 operates to produce a driving connection between clutch member 64 and the ring gear 72 of the second planetary gearset 18. This gearset includes a sun gear 74, a set of planetary pinions 76 in continual meshing engagement with sun gear 74 and ring gear 72, the latter being rotatably supported on a carrier 78 which is drivably connected by spline 80 to the tail shaft 14.

Forward clutch 70 includes a first set of clutch discs drivably connected to the inner surface of clutch member 64 and a second set of clutch discs, each interposed with discs of the first set, drivably connected to the outer surface of ring gear 72. Piston 82 is hydraulically actuated for movement within the cylinder defined by clutch member 64 to force the clutch discs into a drivable connection. Belleville spring 84 returns piston 82 to the disengaged position when hydraulic pressure is removed from the clutch cylinder.

The third planetary gear gearset 44 includes sun gear 86 formed integrally with sun gear 74, ring gear 88 connected by spline 90 to tailshaft 14, a set of planet pinions 92 rotatably supported on carrier 94, which is drivably connected to a first set of brake discs of the low-and-reverse brake 96.

A second set of brake discs of brake 96 is fixed to transmission casing 12. Each disc of the second set is interposed between successive discs of the first disc set of brake 96. Brake piston 98 is actuated hydraulically when cylinder 100 is pressurized to force the piston against the first and second brake disc sets and to produce a drivable connection therebetween against the effect of the return spring 102. Spring 102 forces piston 98 to the brake disengaged position when cylinder 100 is vented. Load block 104, fixed to the transmission casing provides a reaction for the force applied by piston 98 to the disc brake sets.

A third one-way clutch 106 includes an outer race having an undulating profile in conjugate registration with a correspondingly undulating profiled inner surface of carrier 94, illustrated in FIGS. 3 and 4, an inner race 110 bolted to the transmission casing 12, and a driving member located in the annular region between the inner and outer races to produce a one-way drive connection between carrier 94 and the casing.

FIGS. 3 and 4 illustrate one of the three one-way clutches 52, for purposes of illustration. As herein described, clutch 52 includes coaxial inner 52B and outer 52A race portions coaxially connected to ring gear 26. The outer surface 112 of outer race 52A has an undulating profile defined by a plurality of crests and troughs. The inner surface 113 of ring gear 26 has a corresponding undulating profile defined by a like plurality of crests and troughs. The profiles of the outer race outer surface 112 and ring gear inner surface 113 register in conjugate registration. The undulating profile is designed to provide a controlled clearance between the surfaces which provides a gradual lock-up of the surfaces through a wedging or ramping lock-up of the surfaces as rotational forces are communicated through the transmission 10.

As a brake is engaged in the transmission 10 to effect a speed ratio change, inertia reaction forces, shock, are transmitted to housing 12. Instead of the "clunk" normally associated with spline connections in series related friction brake and overrunning clutch transmissions, the ramping lock-up feature of the surfaces reduces this shock and thereby eliminates the "chunk."

The gradual lock-up, through controlled wind-up, eliminates shock loading and reduces torsional vibration in the gear elements upstream and downstream in the transmission. The same principle is used in clutch 54 and brake 106 connections. Although the connection hereinabove described is the outer race of a one-way clutch-transmission element connection, the connection can be utilized to connect the inner race of a one-way clutch to a mating transmission element.

The profile of the crests and troughs is tailored to the application dynamics such as the deflected shape that mating circular surfaces seek when they are radially loaded to enhance and stabilize the one-way response of the clutches 52, 54 and brake 106. The wind-up through ramping lock-up eliminates the on/off locking engagement of splined connections and the associated shock loading upstream and downstream on transmission components as rotational forces are transmitted.

The undulating surfaces 112,113 can be coated with a composite coating of a material such as an elastomeric plastic of synthetic rubber energizing material, or a thermoplastic engineering plastic composite material, either filled or unfilled with various reinforcing materials or fibers to dampen shock loading and further reduce vibration. Alternatively, or in combination, plugs of the shock dampening material can be impregnated into the undulating surfaces 112,113.

While the best mode for carrying out the invention has been described in detail, those familiar with the art to which this invention relates will recognize various alternative designs and embodiments for practicing the invention as defined by the following claims.

I claim:

1. A gear transmission including a housing adapted to transmit torque in one direction between a driving member and a driven member, said transmission comprising:
   a ring gear element;
   a sun gear element;
   a plurality of planet pinions meshing with said ring gear element and sun gear element;
   a carrier element adapted to journal said pinions;
   said driving member being drivably connected to one of said elements, said driven member being drivably connected to a second of said elements;
   series related clutch and brake 34 means for connecting together two of said elements and for anchoring selectively one of said elements to said housing to establish plural torque flow paths through said transmission, said clutch and brake means comprising an inner race and one outer race, each of said races having inner and outer race portions with coaxial surfaces, the coaxial surface of one of said race portions having a first undulating surface, the mating surface of one of said elements defining a second undulating surface in conjugate registration with said first undulating surface, the profiles of said first and second undulating surfaces having a calibrated clearance therebetween and localized contact at a point intermediate the inner and outer radial limit of said coaxial surfaces thereby providing a gradual lock-up of the surfaces through a ramping lock-up between said undulating surfaces thus reducing shock loading at the interface of said inner and outer race portions during ratio changes and during the occurrence of torsional vibration in said gear elements.

2. The transmission of claim 1 wherein said undulating surfaces are defined by a plurality of regularly spaced crests and troughs which establish said profile.

3. The transmission (10) of claim 2 wherein said undulating surfaces (112,113) further includes a plug of a shock absorbing material to dampen shock loading and vibration.

4. The transmission of claim 3 wherein said material is an elastomeric plastic of synthetic rubber energizing material.

5. The transmission of claim 4 wherein said elastomeric plastic is filled with reinforcing material.

6. The transmission of claim 3 wherein said material is a thermoplastic engineering plastic composite material.

7. The transmission of claim 6 wherein said thermoplastic engineering plastic is filled with reinforcing material.

8. The transmission of claim 1 wherein said undulating surfaces further include a composite coating of a material to dampen shock loading and vibration.

9. The transmission of claim 8 wherein said material is an elastomeric plastic of synthetic rubber energizing material.

10. The transmission of claim 9 wherein said elastomeric plastic is filled with reinforcing material.

11. The transmission of claim 10 wherein said thermoplastic engineering plastic is filled with reinforcing material.

12. The transmission of claim 8 wherein said material is a thermoplastic engineering plastic composite material.

13. A gear transmission adapted to transmit torque in one direction between a driving member and a driven member, said transmission comprising:
   a ring gear element;
   a sun gear element;
   a plurality of planet pinions meshing with said ring gear element and sun gear element;
   a carrier element adapted to journal said pinions;
   said driving member being drivably connected to one of said elements, said driven member being drivably connected to a second of said elements;
   a one-way clutch for connecting together two of said elements to establish plural torque flow paths through said transmission, said clutch comprising an inner race and one outer race, each of said races having inner and outer race portions with coaxial surfaces, the coaxial surface of one of said race portions having a first undulating surface, the mating surface of a mating element defining a second undulating surface in conjugate registration with said first undulating surface, the profiles of said first and second undulating surfaces having a calibrated clearance therebetween and localized contact at a point intermediate the inner and outer radial limit of said coaxial surfaces thereby providing a gradual lock-up of the surfaces through a ramping lock-up therebetween said undulating surfaces reducing shock loading at the interface of said inner and outer race portions during ratio changes and during the occurrence of torsional vibration in said gear elements.

14. A gear transmission including a housing adapted to transmit torque in one direction between a driving member and a driven member, said transmission comprising:
   a ring gear element;
   a sun gear element;
   a plurality of planet pinions meshing with said ring gear element and sun gear element;
   a carrier element adapted to journal said pinions;
   said driving member being drivably connected to one of said elements, said driven member being drivably connected to a second of said elements;
   a brake assembly for anchoring one of said elements to said housing establish plural torque flow paths through said transmission, said brake comprising at least one inner race and one outer race, each of said races having concentric inner and outer race portions with coaxial surfaces, the coaxial surface of one of said race portions having a first undulating surface, a mating surface defining a second undulating surface in conjugate registration with said first undulating surface, the profiles of said first and second undulating surfaces having a calibrated clearance therebetween and localized contact at a point intermediate the inner and outer radial limit of said coaxial surfaces thereby providing a gradual lock-up of the surfaces through a ramping lock-up therebetween reducing shock loading at the interface of said inner and outer race portions during ratio changes and torsional vibration in said gear elements.

* * * * *